United States Patent
Mori

(10) Patent No.: US 7,394,559 B2
(45) Date of Patent: Jul. 1, 2008

(54) NETWORK FACSIMILE DEVICE AND A METHOD OF CONTROLLING THE NETWORK FACSIMILE DEVICE

(75) Inventor: Yukikazu Mori, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 448 days.

(21) Appl. No.: 10/801,400

(22) Filed: Mar. 15, 2004

(65) Prior Publication Data

US 2004/0174559 A1     Sep. 9, 2004

Related U.S. Application Data

(63) Continuation of application No. 09/459,769, filed on Dec. 13, 1999, now abandoned.

(30) Foreign Application Priority Data

Dec. 15, 1998  (JP)  ................... 10-355814

(51) Int. Cl.
- *G06F 15/00* (2006.01)
- *G06F 15/16* (2006.01)
- *H04N 1/00* (2006.01)

(52) U.S. Cl. ...................... 358/1.15; 358/402; 358/405; 379/100.06

(58) Field of Classification Search .................. 358/1.15, 358/402, 405, 440, 434, 435, 436, 438, 439; 379/100.01, 100.06
See application file for complete search history.

(56) References Cited

U.S. PATENT DOCUMENTS

| 5,134,501 | A | 7/1992 | Satomi et al. | ................ 358/400 |
| 6,043,904 | A | 3/2000 | Nickerson | .................... 358/442 |
| 6,144,462 | A | 11/2000 | Kaplan | ........................ 358/405 |
| 6,618,749 | B1 * | 9/2003 | Saito et al. | ................... 709/207 |

OTHER PUBLICATIONS

U.S. Appl. No. 07/593,259, filed Oct. 1, 1990.
U.S. Appl. No. 08/040,696, filed Mar. 18, 1998.
U.S. Appl. No. 09/231,387, filed Jan. 13, 1999.

* cited by examiner

*Primary Examiner*—Thomas D Lee
(74) *Attorney, Agent, or Firm*—Cooper & Dunham, LLP

(57) ABSTRACT

A network facsimile device connected to the Internet or a local area network, employs an electronic mail function, and has a function of exchanging image information through said Internet or said local area network and functions of a facsimile device. The device comprises delivery notifying partner storing means for storing a mail address of a destination address to which a confirmation is to be delivered. Delivery confirmation mail confirming means detects, at a time of receiving electronic mail, whether the received electronic mail is an electronic delivery confirmation mail for confirming mail delivery. Delivery confirmation mail transferring means transfers said delivery confirmation mail confirmed by said confirming means to said destination address stored in said delivery notifying partner storing means.

42 Claims, 11 Drawing Sheets

FIG. 3

Date: Thu, 7 Jul 1994 17:16:05 -0400
From: Mail Delivery Subsystem <MAILER-DAEMON@CS.UTK.EDU>
Message-Id: <199407072116.RAA14128@CS.UTK.EDU>
Subject: Returned mail: Cannot send message for 5 days
To: <owner-info mine@cx.utk.edu>
MIME-Version: 1.0
Content-Type; multipart/report; report-type=delivery-status;
    boundary= "RAA14128.773615765/CS.UTK.EDU"

—RAA14128.773615765/CS.UTK.EDU

The original message was received at Sat, 2 Jul 1994 17:10:28 -0400
From root@localhost ―――― The following addresses had delivery problems ――――
<louis@larry.slip.umd.edu> (unrecoverable error)

―――― Transcript of session follows ――――
<louis@larry.slip.umd.edu> ...Deferred: Connection timed out
    with larry.slip.umd.edu.
Message could not be delivered for 5 days
Message will be deleted from queue — RAA14128.773615765/CX.UTK.EDU
content-type: message/delivery-status Reporting-MTA: dns; cs.utk.edu Original-Recipient: rfc822;louisl@larry.slip.umd.edu
Action: failed
Status: 4.0.0
Diagnostic-Code: smtp; 426 conn4ection timed out
Last-Attempt-Date: Thu, 7 Jul 1994 17:15:49 -0400

— RAA14128.773615765/CS.UTK.EDU
content-type: message/rfc822

[original message goes here]
— RAA14128.773615765/CS.UTK.EDU —

FIG. 4

Date: Wed, 20 Sep 1995 00:19:00 (EDT) -0400
From: Joe Recipient <Joe_Recipient@mega.edu>
Message-Id: <199509200019.12345@mega.edu>
Subject: Disposition notification
To: Jane Sender <Jane_Sender@hugc.com>
MIME-Version: 1.0
Content-Type: multipart/report; report-type=disposition-notification;
      boundary= "RAA14128.773615765/mega.edu"

—RAA14128.773615765/mega.edu

The message sent on 1995 Sep 19 at 13:30:00 (EDT) -0400 to joe
Recipient <Joe_Recipient@mega.edu> with subject "First draft of
report" has been displayed. This is no guarantee that the message
has been read or understood.

— RAA14128.773615765/mega.deu
content-type: message/disposition-notification

Reporting-UA: joes-pc.cs.mega.edu; Foomail 97.1
Original-Recipient: rfc822;joe_Recipient@mega.edu
Final-Recipient: rfc822;Joe_Recipient@mega.edu
Original-Message-ID: <199509192301.23456@hugc.com>
Disposition: manual-action/MDN-sent-manually; displayed — RAA14128.773615765/mega.edu
content-type: message/rfc822

[original message goes here]

— RAA14128.773615765/mega.edu —

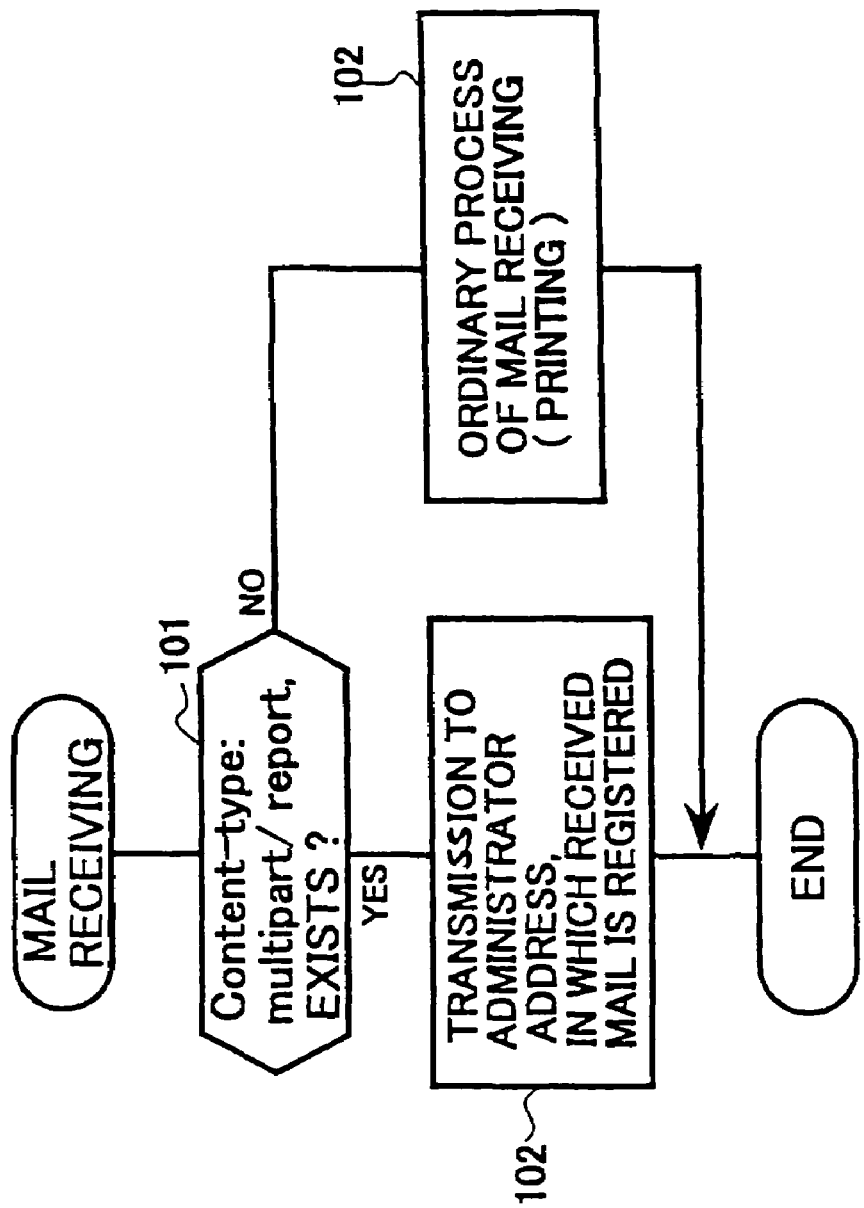

FIG. 10

| SWITCH | CONTENTS | SETTING |
|---|---|---|
| S1 | ALL OF EXPRESS CONFIRMATION MAILS ARE PRINTED. | ON / OFF |
| S2 | ALL OF EXPRESS CONFIRMATION ERRORS ARE PRINTED. | ON / OFF |
| S3 | ALL OF EXPRESS CONFIRMATION MAILS ARE TRANSFERRED BY MAIL. | ON / OFF |
| S4 | ALL OF EXPRESS CONFIRMATION ERRORS ARE TRANSFERRED BY MAIL. | ON / OFF |

NETWORK FACSIMILE DEVICE AND A METHOD OF CONTROLLING THE NETWORK FACSIMILE DEVICE

This application is a Rule 1.53(b) continuation, and claims the priority, of U.S. Ser. No. 09/459,769, filed Dec. 13, 1999, now abandoned the entire contents of which is herein incorporated by reference.

TECHNICAL FIELD

The present disclosure relates to a network facsimile device, and more specifically a device that can be connected to the Internet or a local area network, employing an electronic mail delivery system, and having a function of exchanging image information through the Internet or the local area network, as well as a method of controlling the network facsimile device.

DISCUSSION OF THE BACKGROUND

In recent years, a network facsimile device for communicating facsimile image information by use of electronic mail on the Internet has been developed.

The document RFC(Request For Comments) 2301~2306 published by the organization responsible for collecting technologies relating to the Internet referred to as IETF(Internet Engineering Task Force), prescribes the technical contents of a communication protocol, etc. employed in such a network facsimile device.

In the Internet, a delivery system has been developed for delivering electronic mail to a sending terminal for confirming the delivery of electronic mail to a destination terminal. This type of e-mail is hereinafter referred to as "a delivery confirming mail". This type of delivery confirming mail system is capable of confirming whether electronic mail has been delivered to the address of the communication partner to which it has been addressed. This is an expanded function of the electronic mail system.

In such a delivery confirming mail system, the electronic delivery confirming mail is created both when the electronic mail has been delivered to the mail address to which it was sent and when the electronic mail has not been successfully delivered to the mail address to which it has been sent. In each case, electronic delivery confirming mail is created and delivered to the communication partner which sent the electronic mail.

In the above-mentioned network facsimile device, however, there presently exists no method of surely knowing whether electronic mail which is used for carrying the image information has been delivered to the address of the communication partner to which it is to be delivered. Accordingly, other ways of confirming the delivery of the image information must be considered.

However, confirming the delivery of image information by a network facsimile device which uses e-mail delivery presents its own unique problems. For example, when the network facsimile device receives electronic mail addressed to itself, the network facsimile device performs local processing on the electronic mail. Consequently, if a delivery confirming mail were used to confirm delivery of the electronic mail sent from the network facsimile device, the network facsimile device would record and output the contents of the delivery confirming mail. However if, all of the contents of the delivery confirming mails are recorded and outputted, there arises the problem of wasteful consumption of recording paper. In addition, a user would need to be present at the network facsimile device to read the delivery confirming mail to determine whether the delivery was successful. These and other problems need to be addressed and solved.

SUMMARY

The present disclosure provides an improved network facsimile device. The present invention also provides a method of controlling the above-mentioned network facsimile device. The present invention provides a network facsimile device capable of suitably processing a delivery confirming mail and a method of controlling the network facsimile device.

A network facsimile device connected to the Internet or a local area network, employs an electronic mail function, and has a function of exchanging image information through the Internet or the local area network and functions of a facsimile device. The device comprises delivery notifying partner storing means for storing a mail address of a destination address to which a confirmation is to be delivered. Delivery confirmation mail confirming means detects, at a time of receiving electronic mail, whether the received electronic mail is an electronic delivery confirmation mail for confirming mail delivery. Delivery confirmation mail transferring means transfers the delivery confirmation mail confirmed by the confirming means to the destination address stored in the delivery notifying partner storing means.

According to another aspect, a network facsimile device connected to the Internet or a local area network, employs an electronic mail function, and has a function of exchanging image information through the Internet or the local area network and functions of a facsimile device. The device comprises delivery notifying partner storing means for storing a mail address of a destination address to which a confirmation is to be delivered. Delivery confirmation mail confirming means detects, at a time of receiving electronic mail, whether the received electronic mail is an electronic mail for confirming mail delivery. Delivery confirmation mail confirming means transfers the delivery confirmation mail confirmed by the confirming means to a mail address set in a From address field, when a mail address of a sender is set in the From address field of said delivery confirmation mail, and for transferring the delivery confirming mail to the destination address, when the mail address of the sender individual is not set in the From address field of the electronic mail.

According to yet another aspect, a network facsimile device connected to the Internet or a local area network, employs an electronic mail, function and has a function of exchanging image information through the Internet or the local area network and functions of a facsimile device. The device comprises delivery notifying partner storing means for storing a mail address of a destination address to which a confirmation is to be delivered. Delivery confirmation mail confirming means detects, at a time of receiving electronic mail, whether the received electronic mail is an electronic delivery confirmation mail for confirming mail delivery. Delivery confirmation mail transferring means determines whether the delivery confirmation mail includes contents relating to a transferring error and for transferring the electronic delivery confirmation mail to the destination address stored in the delivery notifying partner storing means.

Other aspects includes additional features and/or various combinations of the above features. Methods of controlling the network facsimile device are also provided.

Other objects, features and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is an outlined explanatory diagram illustrating an example of a delivery confirming mail transmitted back to the sender from the mail server where the mail box of the address is prepared, in case that DSN can be applied;

FIG. 4 is an outlined explanatory diagram illustrating an example of a delivery confirming mail transmitted to the network facsimile device of the sender from the network facsimile device of the address to be delivered when the transmission succeeds, in case that MDN can be applied;

FIG. 5 is a flowchart illustrating an example of processing executed by the network facsimile device FX when the electronic mail is received;

FIG. 10 is an outlined explanatory diagram illustrating an example of a group of switches (soft switches, or hard switches); S1; S2, S3, and S4.

DETAILED DESCRIPTION OF THE PREFERRED EMBODIMENTS

Figure 1:
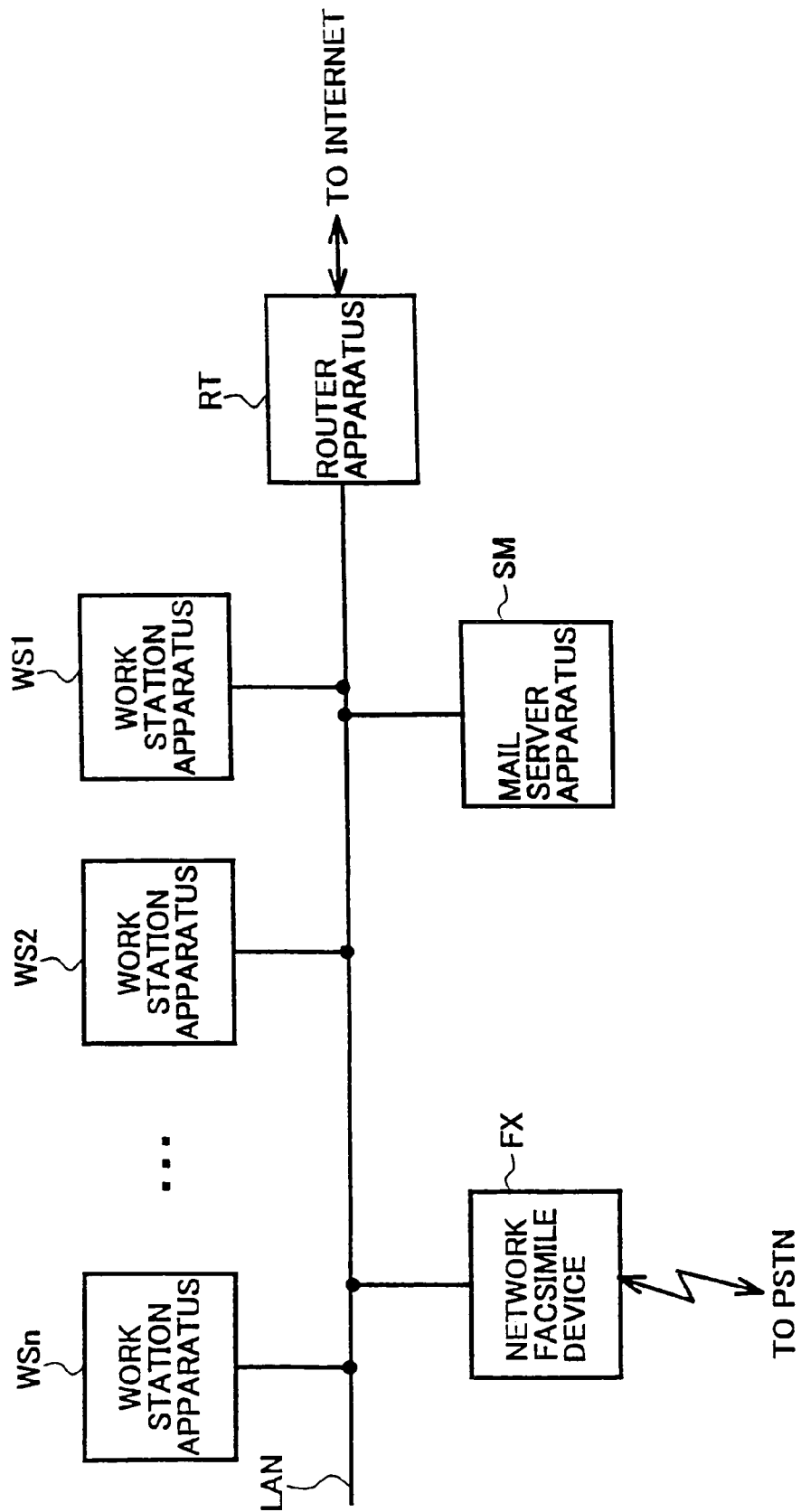
FIG. 1 is a block diagram illustrating a network facsimile system according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Embodiments and modifications of the present invention are described hereinafter, referring to the accompanying drawings, in which FIG. 1 illustrates a network system according to an embodiment of the present invention.

In FIG. 1, plural work station devices WS1~WSn, a mail server device SM, and a network facsimile device FX are connected to a local area network LAN.

Furthermore, the local area network LAN is connected to the Internet through a router device RT. The LAN can exchange various sorts of data between the host devices, etc. connected to other local area networks, etc. and the local area network LAN itself.

Here, the mail server device SM provides a service such as the collection and distribution of electronic mail (discussed later), for users of the work station devices WS1~WSn connected to the local area network LAN, as well as for the network facsimile device FX.

Furthermore, various sorts of programs such as application software (including processes for transmitting and receiving electronic mail, etc.) for exchanging various sorts of data through the local area network LAN, and application software for processing the image information contained in electronic mail received from the network facsimile device FX, etc. are stored in or capable of being accessed by the work station devices WS1=WSn. Those programs are employed by specified users. Here, the specified user may be a single user or a plurality of users.

Furthermore, the network facsimile device FX is provided with a function of transmitting and receiving electronic mail via the local area network LAN, a function of communicating predetermined information, by use of a predetermined point-to-point transmitting procedure, between the work station devices WS1~WSn connected to the local area network LAN and the network facsimile device FX, and a function of connecting the network facsimile device FX to the public network (PSTN) and for transmitting image information using the Group-3 facsimile transmitting procedure by use of the public network as the transmitting path.

Furthermore, the transmission (delivery) of facsimile image information to the work station devices WS1~WSn (users) from the network facsimile device FX can be performed by use of electronic mail.

Now, in the present invention, the combination of the transmission protocol up to the transport layer called TCP/IP and the communication protocol of the higher-ranked layers are basically applied to execute an operation of mutually exchanging data between terminals connected to the local area network LAN. Such combination is called the protocol suite. For instance, a communication protocol called SMTP (Simple Mail Transfer Protocol) is used to exchange electronic mail as a communication protocol of the higher-ranked layers.

Furthermore, the respective terminals can apply the POP (Post Office Protocol) to the mail server device SM as a protocol applied to the confirmation of receiving the electronic mail addressed to the user and requiring the transmission thereof.

Furthermore, communication protocols such as TCP/IP, SMTP, POP, etc. and the data model and the data structure of the electronic mail are respectively prescribed in the RFC (Request For Comments) document. For instance, the TCP, the IP, and the SMTP are respectively prescribed in RFC793, RFC793, and RFC821. The model of the electronic mail is prescribed in RFC822, RFC1521, and RFC1522 [MIME (Multiple Purpose Mail Extension) Model]. Moreover, the model of the electronic mail utilized in the network facsimile device FX is prescribed in RFC2305, and the other technologies of the network facsimile device FX are prescribed in RFC2301~2304, and 2306.

The network facsimile device FX is capable of performing many functions including a function of transmitting a read-out image of an original manuscript document to another Group-3 facsimile device through the public network PSTN, or can transmit the same to the user of the work station devices WS1~WSn through the local area network LAN. The network facsimile device FX can also transmit a read-out image through the Internet. Furthermore, the network facsimile device FX has a function of transferring image information received from other Group-3 facsimile devices through the public network PSTN to the user corresponding to the sub-address designated at that time, by use of electronic mail or transferring image information received from the work station WS on the local area network LAN to a Group-3 facsimile device via the public network PSTN corresponding to a designated address or abbreviated dial number.

Furthermore, electronic mail addressed to the network facsimile device FX itself, which includes image information is received, recorded (printed) and outputted.

Here, the facsimile image information is binary data. However, since binary data cannot be directly included in electronic mail, the binary data is converted to readable information (e.g., 7-bit character code) utilizing a predetermined conversion method, (e.g., Base 64 coding method) and the converted data are contained in the electronic mail. The model of the present description information of such electronic mail is called the "MIME" model.

Figure 2:
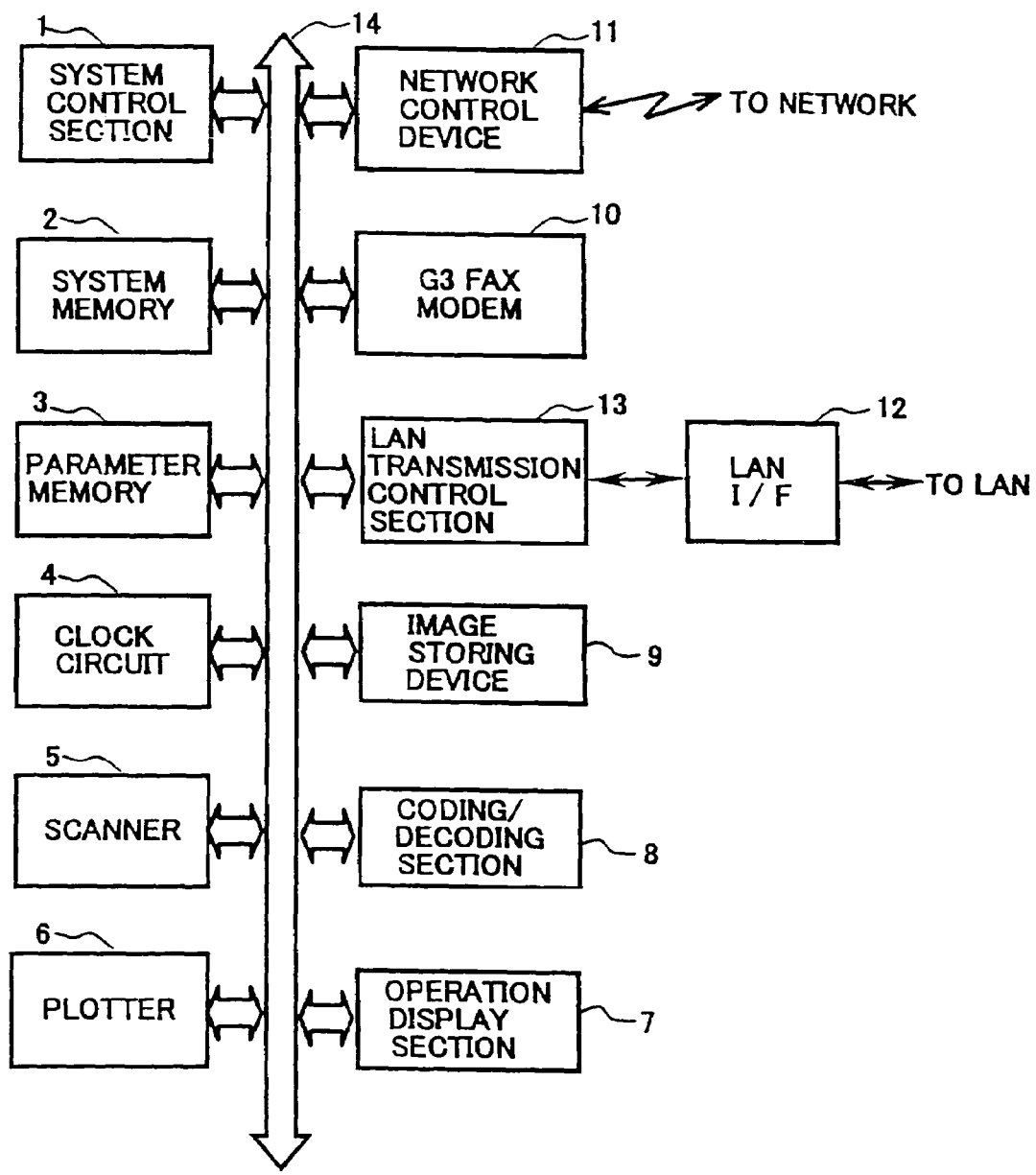
FIG. 2 is a block diagram illustrating the structural example of the network facsimile device FX.

FIG. 2 illustrates a structural example of the network facsimile device FX. In FIG. 2, a system control section 1 performs various sorts of control processes such as for controlling the respective parts of the network facsimile device and processing for the facsimile transmission control procedure. A system memory 2 stores various sorts of data required at the time of executing the processing program and forms a work area for use by the system control section 1. A parameter memory 3 stores, for example, various sorts of information inherent to the network facsimile device such as an administrator mail address (hereinafter, called "Administrator Mail Address"). A clock circuit 4 outputs information of the present time.

A scanner 5 reads out a original document with a predetermined resolution. A plotter 6 records and outputs the image with the predetermined resolution. An operation display section 7 is composed of various operation keys and various display units.

A coding/decoding section 8 codes and compresses the image signal, and decodes the image signal thus coded and compressed. An image storing device 9 stores a large number of image information which has been coded and compressed.

A Group-3 facsimile MODEM 10 realizes the MODEM function of the Group-3 facsimile, and the modem 10 is provided with a low-speed MODEM function (V. 21 MODEM) for exchanging the transmission procedure signal and a high-speed MODEM function (V. 17 MODEM, V. 34 MODEM, V. 29 MODEM, and V. 27ter MODEM, etc.) for exchanging the image information.

A network control device 11 connects the facsimile device to the public network (PSTN), and the device is provided with an automatic transmitting/receiving function.

A local area network interface circuit 12 connects the Internet facsimile device to the local area network LAN. A local area network transmission control section 13 executes various predetermined protocol suite communication control processes (e.g., the electronic mail transmitting and receiving process and a point-to-point communication process, etc.) for exchanging various data between the other data terminal devices and the facsimile device itself through the local area network LAN.

These elements; the system control section 1, the system memory 2, the parameter memory 3, the clock circuit 4, the scanner 5, the plotter 6, the operation display section 7, the coding/decoding section 8, the image storing device 9, the Group-3 facsimile MODEM 10, the network control device 11, and the local area network transmission control section 13, are respectively connected to an internal bus 14. The operation of exchanging data between these respective elements is performed mainly through the internal bus 14.

Furthermore, the operation of exchanging data between the network control device 11 and the Group-3 facsimile MODEM 10 is performed directly.

As mentioned above, in the Internet, a system for distributing delivery confirming mail as an expanded function of the electronic mail system has been already realized as a method for confirming whether electronic mail has been distributed (delivered) to the address to which it is to be communicated.

As to these delivery confirming mail systems, a DSN (Delivery Status Notification) is prescribed in RFC 1891, 1894, and a MDN (Message Delivery Notification) is prescribed in RFC 2298.

Here, in general, the DSN is employed for confirming the delivery to the mail server, while the MDN is employed for confirming the delivery to the receiving terminal. Therefore, the DSN function is carried out with the ordinary mail server device SM, and the MDN function is carried out with the network facsimile device FX serving as the terminal.

FIG. 3 illustrates an example of delivery confirming mail transmitted back to the address to be communicated from the mail server where the mail box of the address is prepared, when the transmission to the mail box fails in the care of applying the DSN. Moreover, the electronic mail shown in FIG. 3 is described as the sample in RFC 1894.

FIG. 4 illustrates an example of the delivery confirming mail transmitted to the network facsimile device of the address to be communicated to the network facsimile device of the sender when the transmission to the mail box succeeds in the case of applying the MDN. The electronic mail shown in FIG. 4 is described as the sample in RFC 2298.

In such way, the DSN delivery confirming mail and the MDN delivery confirming mail respectively confirm whether either one of the DSN is delivered. Regarding the DSN and the MDN, a "Content-Type: multipart/report" field is contained in the header information.

Consequently, in the present embodiment, the network facsimile device FX confirms whether the field of the "Content-Type: multipart/report" is contained in the header information of the electronic mail at the time of receiving the electronic mail. If the field is contained therein, it is possible to recognize that the electronic mail is a delivery confirming mail and can proceed accordingly.

For example, the network facsimile device FX can receive the delivery confirming mail and transfer the received delivery confirming mail to a previously registered administrator mail address.

Thereby, the administrator of the network facsimile device FX can definitely know whether the electronic mail transmitted by the network facsimile device FX has been successfully delivered to the mail address to which it was to be communicated to. The administrator can then promptly take a countermeasure corresponding to the result of the transmission (for instance, an operation for retransmitting the same image information, etc. can be performed). As a result, the method of using the network facsimile device FX can be largely improved.

FIG. 5 illustrates an example of the processes executed by the network facsimile device FX at the time of receiving the electronic mail.

When the electronic mail is received, it is first determined whether the field of the "Content-Type: multipart/report" is contained in the header information (Step 101).

When the field of the "Content-Type: multipart/report" is not contained in the header information and the result of Step 101 becomes "NO", this indicates that the received electronic mail is not delivery confirming mail, and the network facsimile device FX therefore executes an ordinary mail receiving process (Step 102) for recording and outputting the contents of the received electronic mail, and the device FX ends operation.

On the other hand, when the field of the "Content-Type: multipart/report" is contained in the header information and the result of Step 101 becomes, "YES", this indicates that the received electronic mail is a delivery confirming mail, and the network facsimile device FX transfers the received electronic delivery confirming mail to the previously registered administrator mail address (Step 103), and the device FX ends operation.

In the present system, the delivery confirming mail is electronic mail of the multiple part MIME model. An original message "original message goes here" is arranged (distributed) in (one) part thereof, on same occasions. A message "content-type: message/rfc822" is displayed on the part contents recognizing display, the part having such original message distributed thereon is called RFC822, hereinafter.

If such RFC822 part is contained in the delivery confirming mail, the header information of the initial electronic mail will be contained in the contents thereof. Consequently, the From address of the initial electronic mail is also contained therein.

Here, when the user directly operates the network facsimile device FX and transmits the image information by use of electronic mail, the mail address of the sender (e.g., the user) of the initial electronic mail is arranged in the From address field of the initial electronic mail. Consequently, on this occasion, a delivery confirming mail is transferred to the mail address of the sender (user) so that the sender can know the result of the image information transmission. Therefore, it is very convenient for the user.

Furthermore, when the mail address of the sender is not contained in the received delivery confirming mail, the delivery confirming mail can be transferred to a previously registered administrator mail address, and thereby the result of the delivery confirmation can be presented to any of the users at the workstations, for example, by the administrator.

Figure 6:
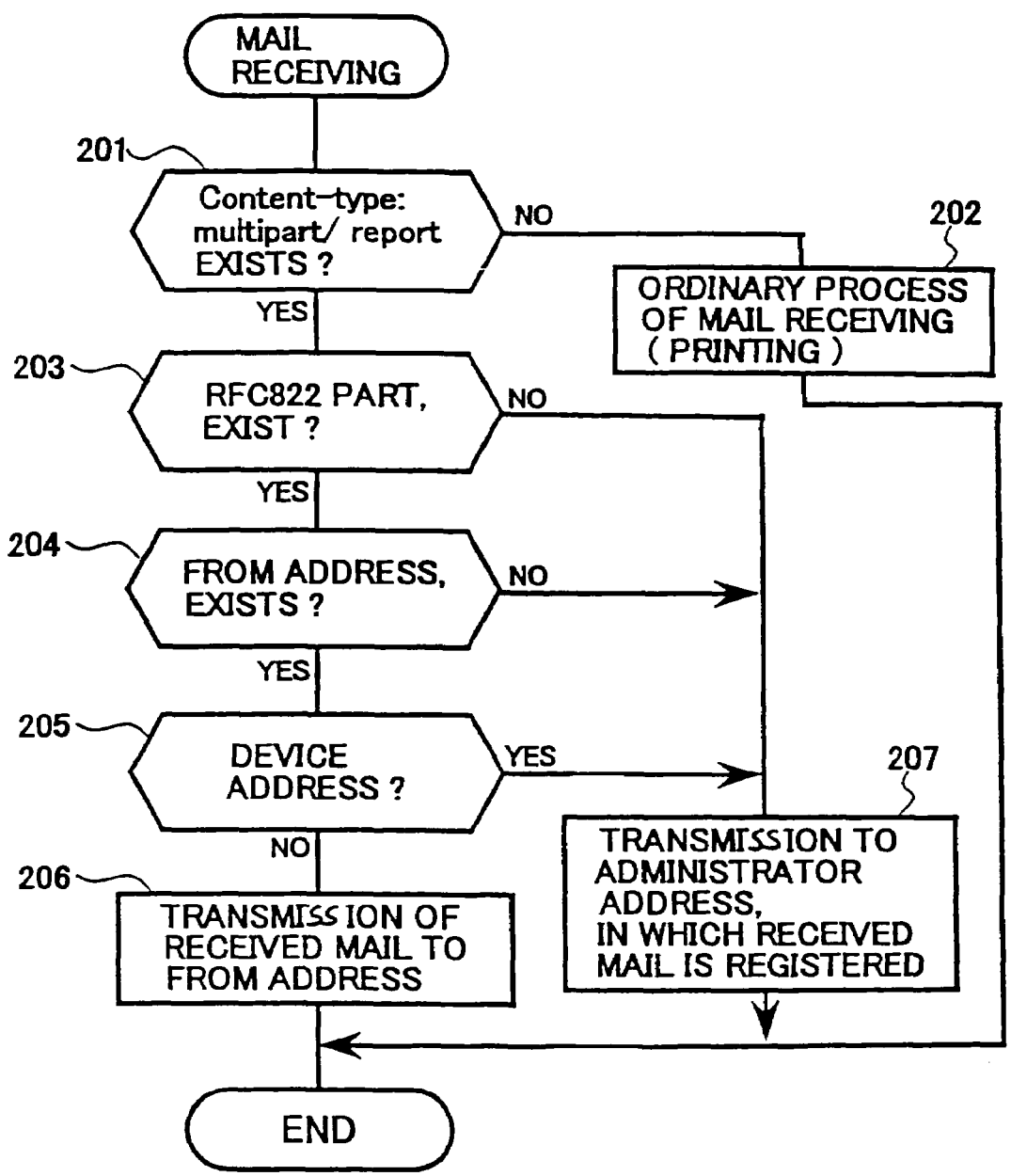
FIG. 6 is a flowchart illustrating another example of processing executed by the network facsimile device FX when the electronic mail is received.

FIG. 6 illustrates an example of the processes executed by the network facsimile device FX at the time of receiving the electronic mail on this occasion.

When the electronic mail is received, whether the "Content-Type: multipart/report" field is contained in the header information is confirmed (Step 201).

When the "Content-Type: multipart/report" field is not contained in the header information and the result of Step 201 becomes "NO", since the received electronic mail is not delivery confirming mail, the network facsimile device FX executes the ordinary mail receiving processes of recording and outputting the contents of the received electronic mail (Step 202), and the device FX ends the operation.

On the other hand, when the "Content-Type: multipart/report" field is contained in the header information and the result of Step 201 becomes "YES", the received electronic mail is a delivery confirming mail. Here, whether the RFC822 part is contained therein is confirmed (Step 203). When the result of Step 203 becomes "YES", whether the From address is contained in the RFC822 part is confirmed (Step 205).

When the result of Step 205 becomes "NO", since the From address contained in the RFC822 part is the mail address of the sender, the received delivery confirming electronic mail is transferred to the From address (Step 206), and the network facsimile device FX ends the operation.

On the other hand, when the result of Step 205 becomes "YES", the From address contained in the part of RFC822 is the mail address of the facsimile terminal itself. On this occasion, the received electronic mail is transferred to the previously registered administrator mail address (Step 207), and the operation is ended.

Furthermore, when the result of Step 204 becomes "NO", or when the result of Step 203 becomes "NO", since an effective From address is not contained therein, the process advances to Step 207 and the received electronic mail is transferred to the previously registered administrator mail address, and the operation is ended.

Figure 7:
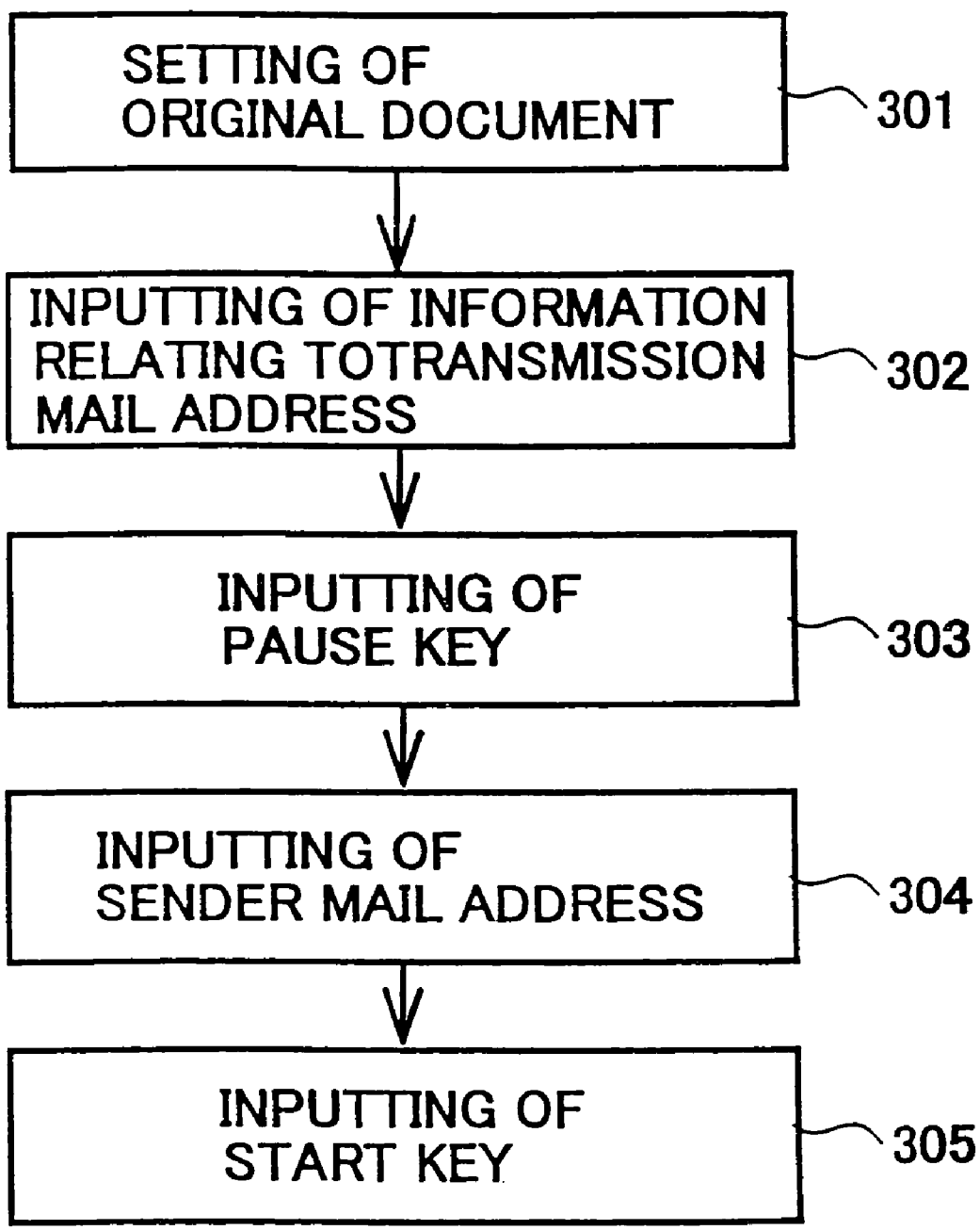
FIG. 7 is a flowchart illustrating an example of the procedure of transmitting the image information, in which the user directly operates the network facsimile device FX and thereby transmits the image information by use of an electronic mail.

When the user directly operates the network facsimile device FX and performs an image information transmission, as illustrated in FIG. 7, the original document is set on (in) the scanner 5 (Step 301), address information indicating the transmission address is inputted from the operation displaying section 7 (Step 302), the pause key is inputted (Step 303), the sender mail address (the facsimile device Fax's mail address) is inputted (Step 304), and the start key is inputted (Step 305). At this time, the transmitting operation is started.

Now, in the DSN and the MDN, the contents of the message itself are not defined. However, when the delivery of data fails, a word or phrase representing the failure of the delivery; such as "Fail", "Failed", "Error", and "Timed out", etc., is used as a reserving word.

Here, whether any of those reserving words appear among the present description of the delivery confirming mail in the area before the RFC822 part appears is determined (searched). When any one or more of the reserving words can be found, it is possible to judge that the delivery confirming mail represents the failure of the transmission.

When delivery fails, the delivery confirming mail is transferred to the sender (user) or administrator, and the fact that the transmission of the designated image information has failed is notified thereto, and thereby the sender (user) or administrator can confirm the fact that the failure in transmission of the image information has occurred and thereby promptly take a suitable countermeasure against the failure.

Figure 8:
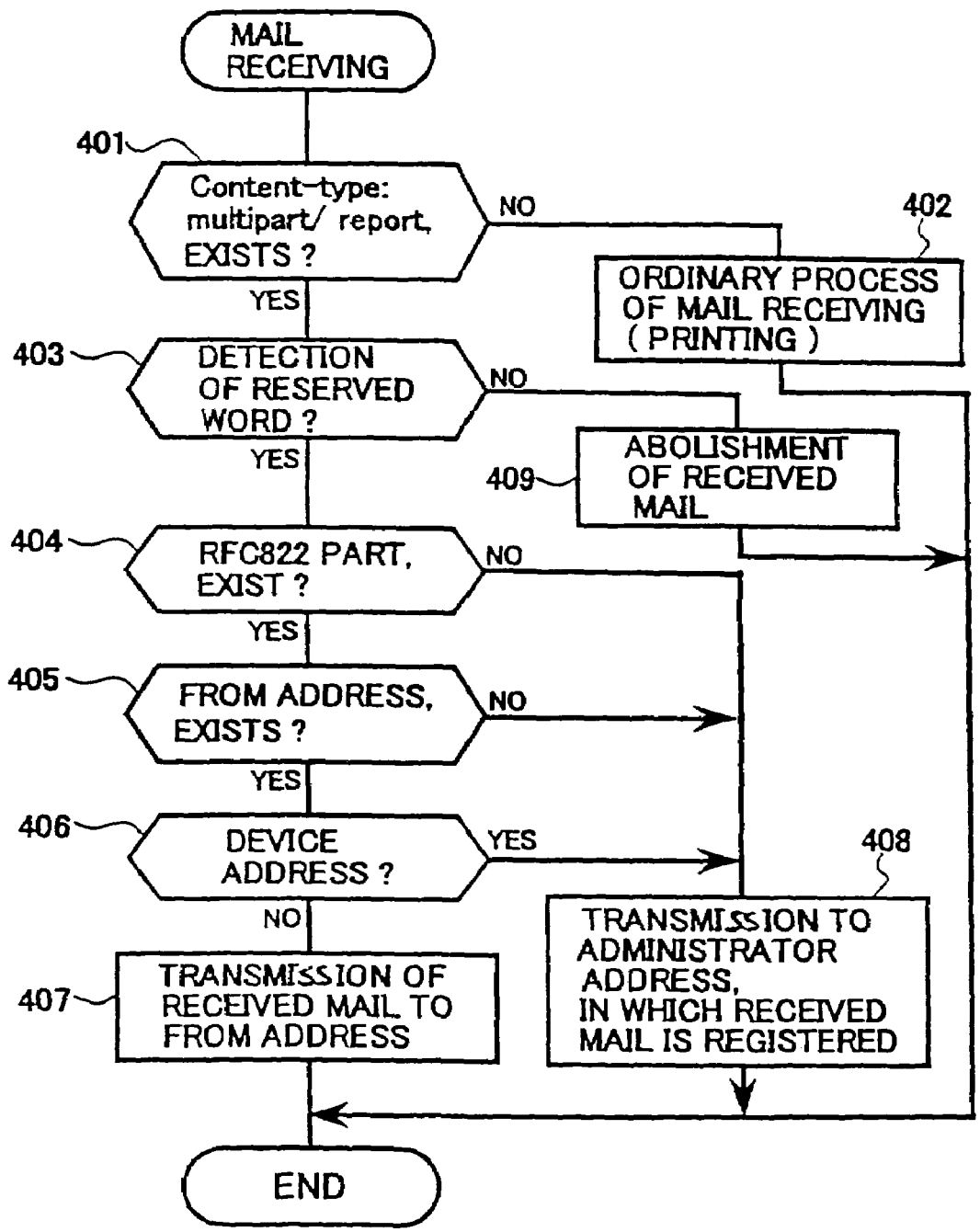
FIG. 8 is a flowchart illustrating still another example of processing executed by the network facsimile device FX when the electronic mail is received.

FIG. 8 illustrates an example of the process executed by the network facsimile device FX at the time of receiving the electronic mail on this occasion.

When the electronic mail is received, whether the field of the "Content-Type: multipart/report" is contained in the header information is confirmed (Step 401).

When the field of the "Content-Type: multipart/report" is not contained therein and the result of Step 401 becomes "NO", since the received electronic mail is not the delivery confirming mail, the network facsimile device FX executes the ordinary mail receiving process of recording and outputting the contents of the received electronic mail (Step 402), and the operation is ended.

On the other hand, when the field of the "Content-Type: multipart/report" is contained in the header information and the result of Step 401 becomes "YES", the received electronic mail is the delivery confirming mail. At this time, whether the receiving word as mentioned above can be detected in the present contents of the electronic mail is determined (Step 403).

Here, when the result of Step 403 becomes "YES", the received delivery confirming mail notifies of a delivery failure. Next, whether the RFC822 part is contained in the delivery confirming mail is confirmed (Step 404). When the result of Step 404 becomes "YES", whether the From address is contained in the RFC822 part is confirmed (Step 405). When the result of Step 405 becomes "YES", whether the From address is the address of the facsimile terminal is confirmed (Step 406).

When the result of Step 406 becomes "NO", since the From address contained in the RFC822 part is the mail address of the sender individual, the received electronic mail is transferred to the From address on this occasion (Step 407), and the operation is ended.

On the other hand, when the result of Step 406 becomes "YES", the From address contained in the RFC822 part is the mail address of the facsimile terminal itself. On this occasion, the received electronic mail is transferred to the previously registered administrator mail address (Step 408), and the operation is ended.

Furthermore, when the result of Step 405 becomes "NO", or when the result of Step 404 becomes "NO", since the effective From address is not contained therein, the process advances to Step 408 and transfers the received electronic mail to the previously registered administrator mail address, and the operation is ended.

On the other hand, when the reserving word as mentioned above could not detected in the present description of the received delivery confirming mail and the result of Step 403 becomes "NO", the electronic mail relating to the transmission of the image information has been suitably delivered to the user at the address to be communicated. Consequently, on this occasion, the received electronic mail is abolished (Step 409), and the operation is ended.

Moreover, when the result of Step 403 becomes "NO", it is also possible to perform the operation of transferring the delivery confirming mail to the registered administrator.

Figure 9:
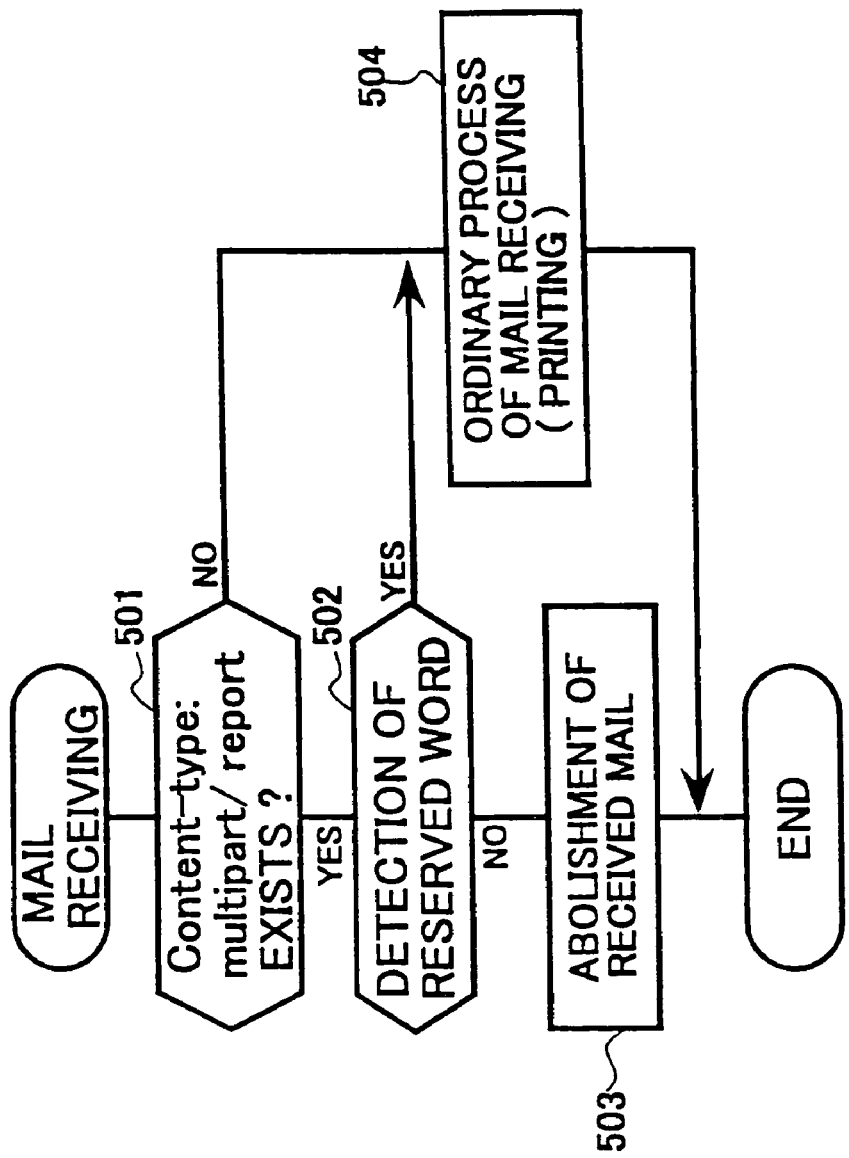
FIG. 9 is a flowchart illustrating still another example of processing executed by the network facsimile device FX when the electronic mail is received.

FIG. 9 illustrates another example of the process executed by the network facsimile device FX at the time of receiving the electronic mail on this occasion.

When the electronic mail is received, whether the "Content-Type: multipart/report" field is contained in the header information is confirmed (Step 501).

When the "Content-Type: multipart/report" field is contained in the header information and the result of Step 501 becomes "YES", the received electronic mail is delivery confirming mail. Whether the above-mentioned reserving word can be detected in the contents of the present description of the electronic mail is then confirmed (Step 502).

Here, when the result of Step 502 becomes "NO", the received delivery confirming mail confirms that the mail delivery has succeeded. Therefore, it is not necessary, in particular, to inform the user of the matter. On this occasion, the received delivery confirming mail is abolished (Step 503), and the operation is ended.

On the other hand, when the result of Step 502 becomes "YES", the received delivery confirming mail notifies the user of a delivery failure. On this occasion, the ordinary mail receiving process is executed and the contents of the delivery confirming mail is recorded and outputted (Step 504), and the operation is ended.

On the other hand, when the field of the Content-Type: multipart/report" is not contained in the header information and the result of Step 501 becomes "NO", since the received electronic mail is not the delivery confirming mail, the process advances to Step 504 and the ordinary mail receiving processes of recording and outputting the contents of the received electronic mail are executed, and then the operation is ended.

In the way as mentioned heretofore, according to the present embodiment, when the delivery confirming mail is received, the delivery confirming mail is recorded and outputted only when the contents thereof indicate a delivery failure. Therefore, it is possible to avoid the wasteful consumption of recording paper, and in addition, the failure of transmitting the image information can be suitably notified to the user.

When the delivery confirming mail is received, it is transferred to the user or the administrator or is recorded and output by the network facsimile device FX. In such situation, the user can set this operation at the time of receiving the delivery confirming mail to the desired state.

For this reason, four switches as shown in FIG. 10 (soft switches or hard switches); S1, S2, S3, and S4 can be provided, as an example, in the network facsimile device FX. The user can suitably set those switches so as to turn the switches on and off.

Figure 11:
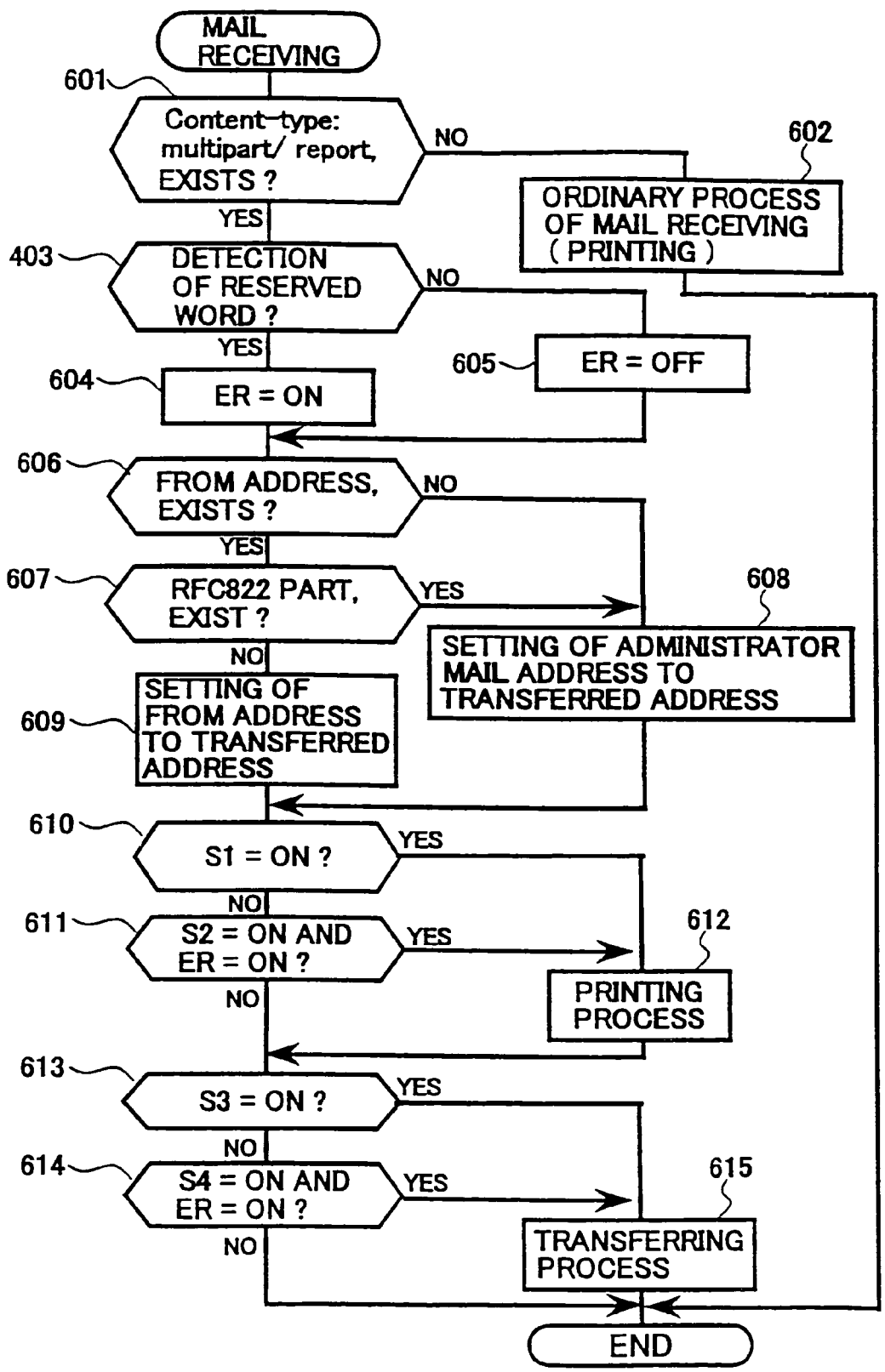
FIG. 11 is a flowchart illustrating still another example of processing executed by the network facsimile device.

On this occasion, the network facsimile device FX executes the processings as illustrated in FIG. 11 at the time of receiving the electronic mail.

When the electronic mail is received, whether the "Content-Type: multipart/report" field is contained in the header information is confirmed (Step 601).

When the field of the "Content-Type: multipart/report" is not contained in the header information and the result of Step 601 becomes "NO", since the received electronic mail is not delivery confirming mail, the ordinary mail receiving processes of recording and outputting the contents of the received electronic mail are executed (Step 602), and the operation is ended.

On the other hand, when the field of the "Content-Type: multipart/report" is contained in the header information and the result of Step 601 becomes "YES", the received electronic mail is delivery confirming electronic mail. In such situation, whether the above-mentioned reserving word can be detected in the contents of the present description of the electronic mail is confirmed (Step 603).

Here, when the result of Step 403 becomes "YES", since the received delivery confirming mail notifies of the failure of the delivery, a flag ER representing the delivery failure is set to "ON" (Step 604). Furthermore, when the result of Step 403 becomes "NO", since the received delivery confirming mail notifies of the success of the delivery, the flag ER representing the delivery failure is set to "OFF" (Step 605).

Next, whether the From address of the RFC822 is contained in the delivery confirming mail is confirmed (Step 606). When the result of Step 606 becomes "YES", whether the From address is the address of the facsimile terminal itself is confirmed (Step 607).

When the result of Step 607 becomes "NO", since the From address contained in the RFC822 part is the mail address of the sender (user), the value of the From address is set as the address of the communication partner to which the delivery confirming mail is to be transferred (Process 609), on this occasion.

Furthermore, when the result of Step 607 becomes "YES", the From address contained in the RFC822 part is the mail address of the facsimile terminal itself. On this occasion, the administrator mail address previously registered as the address to which the delivery confirming mail is to be transferred is set (Step 608). Furthermore, when the result of Step 606 is "NO", the process advances to Step 608, and sets the previously registered administrator mail address as the address to which the delivery confirming mail is to be transferred.

Next, whether the switch S1 is set to "ON" is confirmed (Step 610). When the result of Step 610 becomes "NO", whether the switch S2 is turned "ON" and the flag ER is also turned "ON" is confirmed (Step 611).

When the result of Step 611 becomes "YES", the delivery confirming mail indicates a transmission error, and the switches are set to record and output the mail indicating the error. Furthermore, when the result of Step 610 becomes "YES", the switches are set so that all of the delivery confirming mail is recorded and output. On such occasion, the contents of the delivery confirming mail are recorded and outputted (Step 612).

Next, when the result of Step 611 is "NO", whether the switch S3 is set to "ON" is confirmed (Step 613). When the result of Step 613 becomes "NO", whether the switch S4 is set to "ON" and the flag ER is also set to "ON" is confirmed (Step 614).

When the result of Step 614 becomes "YES", the delivery confirming mail indicates a transmission error. In this case, only the delivery confirming mails which notify of an error are set to be transferred. Furthermore, when the result of Step 613 becomes "YES", all of the delivery confirming mails are set to be transferred. The contents of the delivery confirming mail are transferred to the mail address which is set as the address to which the delivery confirming mail is to be transferred (Step 615).

In such way as mentioned heretofore, according to the present embodiment, since the user can designate whether the contents of the delivery confirming mail are recorded and outputted, or transferred, always or only when an error occurs, it is possible to notify of the transfer confirmation in accordance with the convenience for the user using of device. For instance, even when the administrator mail address has not been previously registered, the contents of the delivery confirming mail can be output or printed by setting the value of the switch S1 to "ON", and therefore, the control of the communication becomes very convenient.

As is apparent from the foregoing description, the present invention can demonstrate the advantageous superior functional effects as mentioned hereinafter.

To state in more detail, according to the present invention, since, when the network facsimile device receives the delivery confirming mail, the device transfers the received delivery confirming mail to a previously registered administrator mail address, the administrator of the network facsimile device can readily know whether the electronic mail transmitted by the network facsimile device is delivered to the mail address to which it is to be communicated or whether is has not been delivered thereto. The administrator can then promptly take suitable countermeasures corresponding to the result of the delivery (for instance, perform an the operation of retransmitting the same image information, etc.), and the convenience of using the network facsimile device can be largely improved, as an advantageous functional effect of the present invention. In addition, since the contents of the delivery confirming mail are not arbitrarily recorded and outputted, it is possible to suppress the wasteful consumption of the recording paper, as another advantageous functional effect of the invention.

Furthermore, when the mail address of the sender individual is contained in the received delivery confirming mail, since the delivery confirming mail can be transferred to the mail address of the sender individual, the sender himself can know the result of the image information transmission. This is very convenient for the sender. This is still another functional effect of the invention.

Furthermore, the system can be set so that when the delivery confirming mail is received, only when the contents thereof represent the failure of the delivery, is the delivery confirming mail recorded and outputted. Thereby, it is possible to avoid the wasteful consumption of recording paper, and in addition, the fact that the image information delivery has failed can be suitably informed to the user. This is still another functional effect of the invention.

Furthermore, since the user can designate whether the contents of the delivery confirming mail are recorded and outputted, or transferred, all the time or only when the error occurs, it is possible to notify the user of the transfer confirmation in accordance with the user's desire. This is still another functional effect of the invention.

Examples and exemplary embodiment of the present invention has been described heretofore. However, other numerous embodiments or variations of the invention are possible in light of the above teachings. It is therefore to be understood that, within the scope of the appended claims, the invention may be practiced otherwise than as specifically described herein and it will be apparent to one of ordinary skill in the art that many changes and modifications can be made thereto without departing from the spirit and scope of the invention as set forth therein.

For example. elements and/or features of different examples and illustrative embodiments may be combined with each other and/or substituted for each other within the scope of this disclosure and appended claims.

This application is based on Japanese Patent Application No. JPAP10-355, 814, field on Dec. 15, 1998, and entire contents of which are herein incorporated by reference.

What is claimed is:

1. A network facsimile device connected to the Internet or a local area network, employing an electronic mail function, and having a function of exchanging image information through said Internet or said local area network and functions of a facsimile device, comprising:
    delivery notifying partner storing means for storing a mail address of a destination address to which a confirmation is to be delivered;
    delivery confirmation mail confirming means for detecting, at a time of receiving electronic mail, whether the received electronic mail is an electronic delivery confirmation mail for confirming mail delivery; and
    delivery confirmation mail transferring means for determining whether the delivery confirmation mail indicates successful mail delivery, and for transferring said delivery confirmation mail confirmed by said confirming means to said destination address stored in said delivery notifying partner storing means when the delivery confirmation mail indicates successful mail delivery.

2. The network facsimile device as defined in claim 1, wherein said network facsimile device further comprises:
    setting means for making valid or invalid said electronic mail transferring operation of said delivery confirmation mail transferring means.

3. A network facsimile device connected to the Internet or a local area network, employing an electronic mail function, and having a function of exchanging image information through said Internet or said local area network and functions of a facsimile device, comprising:
    delivery notifying partner storing means for storing a mail address of a destination address to which a confirmation is to be delivered;
    delivery confirmation mail confirming means for detecting, at a time of receiving electronic mail, whether the received electronic mail is an electronic mail for confirming mail delivery; and
    delivery confirmation mail transferring means for transferring said delivery confirmation mail confirmed by said confirming means to a mail address set in a From address field, when a mail address of a sender is set in said From address field of said delivery confirmation mail, and for transferring said delivery confirming mail to the destination address, when the mail address of the sender individual is not set in said From address field of said electronic mail.

4. The network facsimile device as defined in claim 3, wherein said network facsimile device further comprises:
setting means for making valid or invalid said electronic mail transferring operation of said delivery confirmation mail transferring means.

5. A network facsimile device connected to the Internet or a local area network, employing an electronic mail, function and having a function of exchanging image information through said Internet or said local area network and functions of facsimile device, comprising:
delivery notifying partner storing means for storing a mail address of a destination address to which a confirmation is to be delivered;
delivery confirmation mail confirming means for detecting, at a time of receiving electronic mail, whether the received electronic mail is an electronic delivery confirmation mail for confirming mail delivery; and
delivery confirmation mail transferring means for determining whether said delivery confirmation mail includes contents relating to a transferring error and for transferring said electronic delivery confirmation mail to the destination address stored in said delivery notifying partner storing means, when the contents relating to the transferring error are not contained in the delivery confirmation mail.

6. The network facsimile device as defined in claim 5, wherein said network facsimile device further comprises:
setting means for making valid or invalid said electronic mail transferring operation of said delivery confirmation mail transferring means.

7. A network facsimile device connected to the Internet or a local area network, employing an electronic mail function, and having a function of exchanging image information through said Internet or said local area network and functions of a facsimile device comprising:
delivery notifying partner storing means for storing a mail address of a destination address to which a confirmation is to be delivered;
delivery confirmation mail confirming means for detecting at a time of receiving electronic mail, whether the received electronic mail is an electronic delivery confirmation mail for confirming mail delivery; and
delivery confirmation mail transferring means
for confirming whether a mail address of a sender is set in a From address field of said electronic delivery confirmation mail confirmed by said delivery confirmation mail confirming means and for confirming whether said delivery confirmation mail includes predetermined contents relating to a transferring error, and
for transferring said electronic delivery confirmation mail to both said mail address set in said From address field of said electronic delivery confirmation mail and said destination address stored in said delivery notifying partner storing means, when said delivery confirmation mail includes predetermined contents relating to said transferring error contained in said electronic delivery continuation mail and when said mail address of the sender is set in the From address field of said electronic delivery confirmation mail,
for transferring said electronic delivery confirmation mail to said destination address stored in said delivery notifying partner storing means, when said delivery confirmation mail includes predetermined contents relating to said transferring error contained in said electronic delivery confirmation mail and when said mail address of the sender is not set in the From address field of said electronic mail,
for transferring said electronic delivery confirmation mail to said mail address set in said From address field of said electronic delivery confirmation mail, when said predetermined contents relating to said transferring error not contained in said electronic delivery confirmation mail and when said mail address of the sender is set in the From address field of said electronic delivery confirmation mail, and
for transferring said electronic delivery confirmation mail to said destination address stored in said delivery notifying partner storing means, when said predetermined contents relating to said transferring error are not contained in the contents of said electronic delivery confirmation mail and when said mail address of the sender individual is not set in the From address of said electronic delivery confirmation mail.

8. The network facsimile device as defined in claim 7, wherein said network facsimile device further comprises:
setting means for making valid or invalid said electronic mail transferring operation of said delivery confirmation mail transferring means.

9. A network facsimile device connected to an Internet or a local area network, employing an electronic mail function, and having a function of exchanging image information through said Internet or said local area network and functions of a facsimile device, comprising:
delivery notifying partner storing means for storing a mail address of a destination address to which a confirmation is to be delivered;
delivery confirmation mail confirming means for detecting at a time of receiving electronic mail, whether the received electronic mail is an electronic delivery confirmation mail for confirming mail delivery; and
delivery confirmation mail processing means
for confirming whether an address of a sender is set in a From address field of said electronic mail detected by said delivery confirmation mail confirming means to be an electronic delivery continuation mail for confirming the delivery, and for confirming whether predetermined contents relating to a transferring error are contained in contents of said electronic delivery confirmation mail,
for visibly outputting said contents of said electronic delivery confirmation mail, when said predetermined contents relating to said transferring error are contained in said contents of said electronic mail, or
for transferring said electronic delivery confirmation mail to both of said mail address set in said From address field of said electronic delivery confirmation mail and said destination address stored in said delivery notifying partner storing means, when said predetermined contents relating to said transferring error are contained in the contents of said electronic delivery confirmation mail and when said mail address of the sender is set in the From address field of said electronic delivery confirmation mail,
for transferring said electronic delivery confirmation mail to said mail address of said From address of said electronic delivery confirmation mail, when said predetermined contents relating to said transferring error are not contained in said contents of said electronic delivering confirmation mail and when said mail address of said sender is set in said From address of said electronic delivery confirmation mail, and for transferring said electronic delivery confirmation mail to said destination address stored in said delivery notifying partner storing means, when said predetermined contents relating to said transferring error are not contained in said contents of said electronic delivery confirmation mail and when said mail address of said sender is not set in said From address of said electronic delivery confirmation mail.

10. The network facsimile device as defined in claim 9, wherein said network facsimile device further comprises:
first setting means for making valid or invalid said electronic mail transferring operation of said delivery continuation mail processing means; and second setting means for making valid or invalid visible display of said electronic mail of said delivery confirmation mail processing means.

11. A method of controlling a network facsimile device connected to the Internet or a local area network, employing a function of exchanging image information through said Internet or said local area network and functions of a facsimile device, comprising the steps of:
storing a delivery notifying destination's partner mail address;
detecting, at a time of receiving an electronic mail, whether said received electronic mail is an electronic delivery confirmation mail for confirming delivery of electronic mail;
confirming whether the electronic delivery confirmation mail indicates successful delivery; and
transferring said electronic delivering confirmation mail to said delivery notifying mail address stored in said delivery notifying partner step when said received electronic mail is an electronic delivering confirmation mail indicating the successful delivery.

12. A method of controlling a network facsimile device connected to the Internet or a local area network, employing a function of exchanging image information through said Internet or said local area network and functions of a facsimile device, comprising the steps of:
storing a delivery notifying destination mail address;
detecting, at a time of receiving an electronic mail, whether said received electronic mail is an electronic mail for confirming delivery of the electronic mail;
transferring said electronic delivery confirmation mail, when said received electronic mail is an electronic delivery confirmation mail for confirming the delivery, to a mail address of a From address, when an address of a sender is set in a From address field of said electronic delivery confirmation mail; and
transferring said electronic delivery confirmation mail, when said received electronic mail is an electronic delivery confirmation mail for confirming the delivery, to the stored destination address, when the mail address of the sender is not set in said From address of said electronic delivery confirmation mail.

13. A method of controlling a network facsimile device connected to the Internet or a local area network, employing a function of exchanging image information through said Internet or said local area network and functions of a facsimile device, comprising the steps of:
storing a delivery notifying destination mail address;
detecting, at a time of receiving an electronic mail, whether said mail is an electronic delivery confirmation mail for confirming delivery of the electronic mail;
confirming, when said received electronic mail is the electronic delivery confirmation mail, whether a mail address of a sender is set in a From address field of said electronic delivery confirmation mail;
confirming whether predetermined contents relating to a transferring error are contained in contents of said electronic delivery confirmation mail;
transferring said electronic delivery confirmation mail to both said mail address set in said From address field of said electronic delivery confirmation mail and said stored destination mail address, when said predetermined contents relating to said transferring error are contained in said contents of said electronic delivery confirmation mail, and when the mail address of the sender is set in said From address field of said electronic delivery confirmation mail;
transferring said electronic delivery confirmation mail to said stored destination mail address, when said predetermined contents relating to said transferring error are contained in said contents of said electronic delivery confirmation mail, and when the mail address of the sender individual is not set in said From address field of said electronic delivery confirmation mail;
transferring said electronic delivery confirmation mail to said mail address set in said From address field of said electronic mail, when said predetermined contents relating to said transferring error are not contained in said contents of said electronic delivery confirmation mail, and when the mail address of the sender is set in From address field of said electronic delivery confirmation mail;
transferring said electronic delivery confirmation mail to said stored destination mail address, when said predetermined contents relating to said transferring error are not contained in said contents of said electronic delivery confirmation mail, and when the mail address of the sender is set in said From address field of said electronic delivery confirmation mail.

14. A method of controlling a network facsimile device connected to the Internet or a local area network, employing a function of exchanging image information through said Internet or said local area network and functions of a facsimile device, comprising the steps of:
storing a delivery notifying destination mail address;
detecting, at a time of receiving an electronic mail, whether said received electronic mail is an electronic delivery confirmation mail for confirming delivery of the electronic mail;
confirming, when said received electronic mail is the electronic delivery confirmation mail for confirming the delivery, whether a mail address of a sender is set in a From address field of said electronic delivery confirmation mail;
transferring said electronic delivery continuation mail to said stored destination mail address, when mail address of the sender is not set in the From address field of said electronic delivery confirmation mail; and
visually outputting the contents of said electronic delivery confirmation mail.

15. A method of controlling a network facsimile device connected to the Internet or a local area network, employing a function of exchanging image information through said Internet or said local area network and functions of a facsimile device, comprising the steps of:
storing a delivery notifying destination mail address;
detecting at a time of receiving an electronic mail, whether said received electronic mail is an electronic delivery confirmation mail for confirming delivery of electronic mail;

confirming whether a mail address of a sender is set in a the From address field of said electronic delivery confirmation mail, when said received electronic mail is an electronic mail for confirming the delivery;

confirming whether predetermined contents relating to a transferring error are contained in contents of said electronic delivery confirmation mail;

visually outputting the contents of said electronic delivery confirmation mail, when said predetermined contents relating to said transferring error are contained in said contents of said electronic delivery confirmation mail;

transferring said electronic delivery confirmation mail to both said mail address set in said From address field of said electronic mail and said stored destination mail address, when said predetermined contents relating to said transferring error are contained in said contents of said electronic delivery confirmation mail, and when said mail address of said sender is set in said From address field of said electronic delivery confirmation mail;

transferring said electronic delivery confirmation mail to said stored destination mail address, when said predetermined contents relating to said transferring error are contained in said contents of said electronic delivery confirmation mail, when said predetermined contents relating to said transferring error are contained in said contents of said electronic delivery confirmation mail, and when said mail address of said sender individual is not set in said From address field of said electronic delivery confirmation mail;

transferring said electronic delivery confirmation mail to said mail address of said From address field of said electronic delivery confirmation mail, when said predetermined contents relating to said transferring error are not contained in said contents of said electronic delivery confirmation mail, and when said mail address of said sender individual is set in said From address field of said electronic mail; and transferring said electronic delivery confirmation mail to said stored destination mail address, when said predetermined contents relating to said transferring error are not contained in said contents of said electronic delivery confirmation mail, and when said mail address of said sender is not set in said From address of said electronic delivery confirmation mail.

16. A programmed network facsimile device connected to the Internet or a local area network, employing an electronic mail function, and having a function of exchanging image information through said Internet or said local area network and functions of a facsimile device, said programmed network facsimile device executing control code embodied in a computer readable medium, said control code comprising:

code for storing a mail address of a destination address to which a confirmation is to be delivered;

code for detecting, at a time of receiving electronic mail, whether the received electronic mail is an electronic delivery confirmation mail for confirming mail delivery; and code for confirming whether the electronic delivery confirmation mail indicates successful mail delivery, and for transferring said delivery confirmation mail confirmed by said confirming means to said destination address stored in said delivery notifying partner storing means when the electronic delivery confirmation mail indicates successful delivery.

17. A programmed network facsimile device connected to the Internet or a local area network, employing an electronic mail function, and having a function of exchanging image information through said Internet or said local area network and functions of a facsimile device, said programmed network facsimile device executing control code embodied in a computer readable medium, said control code comprising:

code for storing a mail address of a destination address to which a confirmation is to be delivered;

code for detecting, at a time of receiving electronic mail, whether the received electronic mail is an electronic mail for confirming mail delivery; and code for transferring said delivery confirmation mail confirmed by said confirming means to a mail address set in a From address field, when a mail address of a sender is set in said Front address field of said delivery confirmation mail, and for transferring said delivery confirming mail to the destination address, when the mail address of the sender individual is not set in said From address field of said electronic mail.

18. A programmed network facsimile device connected to the Internet or a local area network, employing an electronic mail, function and having a function of exchanging image information through said Internet or said local area network and functions of a facsimile device, said programmed network facsimile device executing control code embodied in a computer readable medium, said control code comprising:

code for storing a mail address of a destination address to which a confirmation is to be delivered;

code for detecting, at a time of receiving electronic mail, whether the received electronic mail is an electronic delivery confirmation mail for confirming mail delivery; and code for determining whether said delivery confirmation mail includes contents relating to a transferring error and for transferring said electronic delivery confirmation mail to the destination address stored in said delivery notifying partner storing means, when the contents relating to the transferring error are not contained in the delivery confirmation mail.

19. A network facsimile device connected to a network, comprising:

mailer means for transmitting and/or receiving electronic mail through the network, the electronic mail being accompanied by a facsimile image representation, memory means for storing a destination address to which a mail delivery notification is to be sent, mail detecting means for determining, upon reception of the received mail, whether a received mail is a delivery notification, mail transferring means for determining whether the delivery notification indicates successful delivery, and for transferring the received mail to the destination address, when the received mail is determined to be a delivery notification confirming successful delivery.

20. The network facsimile device as defined in claim 19, further comprising:

setting means for making valid or invalid said mail transferring operation of said mail transferring means.

21. A network facsimile device connected to a network, comprising:

mailer means for transmitting and/or receiving electronic mail through the network, the electronic mail being accompanied by a facsimile image representation, memory means for storing a destination address to which a mail delivery notification is to be sent;

determining means for determining whether a received delivery notification contains a sender address in a From address field; and mail transferring means for transferring the received delivery notification according to the determination result of the determining means.

22. A network facsimile device according to claim 21, wherein the mail transferring means transfers the received delivery notification to the sender address when the delivery notification contains the sender address in the From address field.

23. A network facsimile device according to claim 21, wherein the mail transferring means transfers the received delivery notification to the destination address when the delivery notification does not contain the sender address in the From address field.

24. A network facsimile device according to claim 21, further comprising:
setting means for making valid or invalid said electronic mail transferring operation of said mail transferring means.

25. A network facsimile device connected to a network, comprising:
mailer means for transmitting and/or receiving electronic mail through the network, the electronic mail being accompanied by a facsimile image representation;
memory means for storing a destination address to which a mail delivery notification is to be sent;
mail detecting means for determining whether a received mail is a delivery notification, upon reception of the received mail;
first determining means for determining whether a received delivery notification contains a sender address in the From address field;
second determining means for determining whether the received delivery notification contains error information which indicates an error occurrence; and
mail transferring means for transferring the received delivery notification according to the determination result of the first and second determining means.

26. A network facsimile device according to claim 25, wherein the mail transferring means transfers the received delivery notification to the destination address when the delivery notification contains the sender address in the From address field and contains the error occasion information.

27. A network facsimile device according to claim 25, further comprising:
setting means for making valid or invalid the transferring operation of said mail transferring means.

28. A network facsimile apparatus comprising:
a storage device configured to store a mail address of a destination address to which a confirmation is to be delivered;
a delivery confirmation detection part configured to detect, at a time of receiving electronic mail, whether the received electronic mail is an electronic mail for confirming mail delivery; and
a processing part configured to transfer the electronic delivery confirmation mail confirmed by said delivery confirmation detection part to a mail address set in a From address field, when a mail address of a sender is set in said From address field of said delivery confirmation mail, and transfer said delivery confirming mail to the destination address, when the mail address of the sender individual is not set in said From address field of said electronic mail.

29. The network facsimile apparatus as defined in claim 28, further comprising:
a setting part configured to make valid or invalid said electronic mail transferring operation of said delivery confirmation transfer part.

30. A network facsimile apparatus comprising:
a storage device configured to store a mail address of a destination address to which a confirmation is to be delivered;
a delivery confirmation detection part configured to detect, at a time of receiving electronic mail, whether the received electronic mail is an electronic delivery confirmation mail for confirming mail delivery; and
a processing part configured to
confirm whether a mail address of a sender is set in a From address field of the electronic delivery confirmation mail confirmed by said delivery confirmation detection part and confirm whether said delivery confirmation mail includes predetermined contents relating to a transferring error, and
transfer said electronic delivery confirmation mail to both said mail address set in said From address field of said electronic delivery confirmation mail and said destination address stored in said storage device, when said delivery confirmation mail includes predetermined contents relating to said transferring error contained in said electronic delivery confirmation mail and when said mail address of the sender is set in the From address field of said electronic delivery confirmation mail,
transfer said electronic delivery confirmation mail to said destination address stored in said storage device, when said delivery confirmation mail includes predetermined contents relating to said transferring error contained in said electronic delivery confirmation mail and when said mail address of the sender is not set in the From address field of said electronic mail,
transfer said electronic delivery confirmation mail to said mail address set in said From address field of said electronic delivery confirmation mail, when said predetermined contents relating to said transferring error not contained in said electronic delivery confirmation mail and when said mail address of the sender is set in the From address field of said electronic delivery confirmation mail, and
transfer said electronic delivery confirmation mail to said destination address stored in said storage device, when said predetermined contents relating to said transferring error are not contained in the contents of said electronic delivery confirmation mail and when said mail address of the sender individual is not set in the From address of said electronic delivery confirmation mail.

31. The network facsimile apparatus as defined in claim 30, further comprises:
a setting part configured to make valid or invalid said electronic mail transferring operation of said delivery confirmation transfer part.

32. A network facsimile apparatus comprising:
a storage device configured to store a mail address of a destination address to which a confirmation is to be delivered;
a delivery confirmation detection part configured to detect, at a time of receiving electronic mail, whether the received electronic mail is an electronic delivery confirmation mail for confirming mail delivery; and
a processing part configured to
confirming whether an address of a sender is set in a From address field of said electronic mail detected by said delivery confirmation detection part to be an electronic delivery confirmation mail for confirming the delivery, and for confirming whether predetermined contents relating to a transferring error are contained in contents of said electronic delivery confirmation mail, visibly output said contents of said electronic delivery confirmation mail, when said predetermined contents relating to said transferring error are contained in said contents of said electronic mail, or transfer said electronic delivery confirmation mail to both of said mail address set in said From address field of said electronic delivery confirmation mail and said destination address stored in said storage device, when said predetermined contents relating to said transferring error are contained in the contents of said electronic delivery confirmation mail and when said mail address of the sender is set in the From address field of said electronic delivery confirmation mail, transfer said electronic delivery confirmation mail to said mail address of said From address of said electronic delivery confirmation mail, when said predetermined contents relating to said transferring error are not contained in said contents of said electronic delivering confirmation mail and when said mail address of said sender is set in said From address of said electronic delivery confirmation mail, and transfer said electronic delivery confirmation mail to said destination address stored in said storage device, when said predetermined contents relating to said transferring error are not contained in said contents of said electronic delivery confirmation mail and when said mail address of said sender is not set in said From address of said electronic delivery confirmation mail.

33. The network facsimile apparatus as defined in claim 32, further comprises:
a first setting part configured to make valid or invalid said electronic mail transferring operation of said processing part; and
a second setting part configured to make valid or invalid visible display of said electronic mail of said processing part.

34. A network facsimile apparatus comprising:
a mailer part configured to transmit and/or receive electronic mail through the network, the electronic mail being accompanied by a facsimile image representation;
a storage device configured to store a destination address to which a mail delivery notification is to be sent; and
a processing part configured to determine whether a received delivery notification contains a sender address in a From address field, and transfer the received delivery notification according to the determination result.

35. The network facsimile apparatus as defined in claim 34, wherein the processing part transfers the received delivery notification to the sender address when the delivery notification contains the sender address in the From address field.

36. The network facsimile apparatus as defined in claim 34, wherein the processing part transfers the received delivery notification to the destination address when the delivery notification does not contain the sender address in the From address field.

37. The network facsimile apparatus as defined in claim 34, further comprising:
a setting part configured to make valid or invalid said electronic mail transferring operation of said processing part.

38. A network facsimile apparatus comprising:
a mailer part configured to transmit and/or receive electronic mail through the network, the electronic mail being accompanied by a facsimile image representation;
a storage device configured to store a destination address to which a mail delivery notification is to be sent;
a detecting part configured to determine whether a received mail is a delivery notification, upon reception of the received mail;
a processing part configured to determine whether a received delivery notification contains a sender address in the From address field, determine whether the received delivery notification contains error information which indicates an error occurrence, and transfer the received delivery notification according to the determination results.

39. The network facsimile apparatus as defined in claim 38, wherein the processing part transfers the received delivery notification to the destination address when the delivery notification contains the sender address in the From address field and contains the error occasion information.

40. The network facsimile apparatus as defined in claim 38, further comprising:
a setting part configured to make valid or invalid the transferring operation of said processing part.

41. A network facsimile apparatus comprising:
a mailer part configured to transmit and/or receive electronic mail through the network, the electronic mail being accompanied by a facsimile image representation,
a storage device configured to store a destination address to which a mail delivery notification is to be sent,
a detecting part configured to determine, upon reception of the received mail, whether a received mail is a delivery notification
a processing part configured to determine whether the delivery notification indicates successful delivery, and transfer the received mail to the destination address, when the delivery notification indicates successful delivery.

42. A network facsimile apparatus comprising:
a storage device configured to store a mail address of a destination address to which a confirmation is to be delivered;
a detecting part configured to detect, at a time of receiving electronic mail, whether the received electronic mail is an electronic delivery confirmation mail for confirming mail delivery; and
a processing part configured to determine whether the electronic delivery confirmation mail indicates successful delivery, and transfer said delivery confirmation mail confirmed by said detecting part to said destination address stored in said storage device when the electronic delivery confirmation indicates successful delivery.

* * * * *